Jan. 7, 1958  C. E. STUART  2,818,646
AXIS-ORBITAL PLANE RECORDER
Filed March 31, 1955
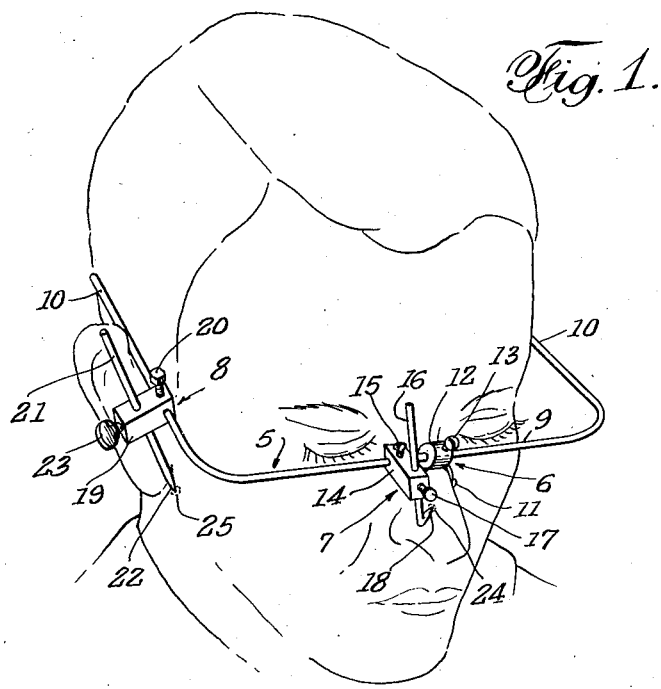
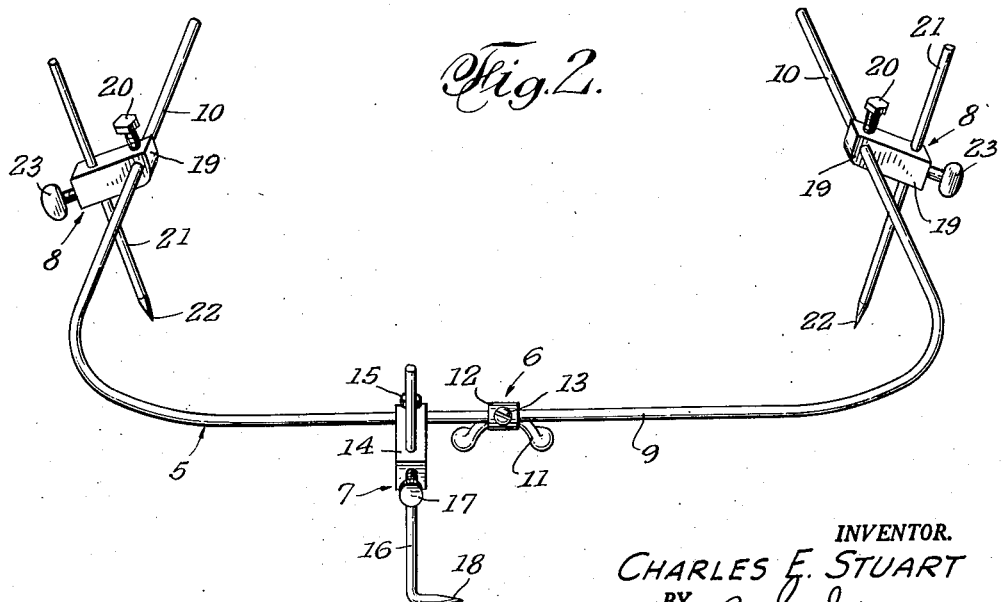
INVENTOR.
CHARLES E. STUART
BY C. G. Stratton
ATTORNEY

United States Patent Office 2,818,646
Patented Jan. 7, 1958

2,818,646

AXIS-ORBITAL PLANE RECORDER

Charles E. Stuart, Ventura, Calif.

Application March 31, 1955, Serial No. 498,353

7 Claims. (Cl. 32—20)

This invention relates to means, employed in dentistry, for recording for future reference, the orbital plane and, more particularly, to record the points on the side of the face that represent the hinge axis of the mandibular joints and a point on the lower border of the right orbit, as on the right side of the nose.

The above-mentioned hinge axis may be found by using a conventional face bow firmly attached to the lower jaw or teeth. Said bow carries two adjustable styli, one on each side, the same operating just anterior to the auditory meatus and tragus in the region of the condyles of the mandibles. While successively opening and closing the jaws, each stylus is adjusted until it moves in a rotary path only. These rotary paths or movements have center points and these points are marked on the sides of the face.

The orbital point is determined by palpating the lower border of the orbit and may be marked there, or this point or level may be projected, in line with the axis points, to the side of the nose. The two axis points, together with the orbital point, establish the axis-orbital plane, which is used to transfer to a dental articulator the relative positions that the teeth occupy in the head with reference to the opening-closing axis and orbital plane.

During the course of dental treatment and the construction of artificial dentures of various kinds, it is necessary to make many transfers of diagnostic and working models of the mouth to an instrument, such as an articulator, which reproduces the movements of the mandible. Accordingly, it is an object of the present invention to provide a device or instrument that re-locates the above-mentioned three-points of an orbital plane in an accurate and precise manner whenever transfers of said plane to an articulator is necessary.

It is present practice to tatoo the three axis-orbital points on the face. This tatooing is made as inconspicuous as possible, with the result that the same frequently fades and disappears in a matter of a few years. This invention contemplates simple means for re-locating said points in the event that the same may have disappeared, as indicated.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of part, which will more fully appear in the course of the following description. However, the drawing merely shows and the following description merely describes one embodiment of the present invention, which is given by way of illustration or example only.

In the drawing, like reference characters designate similar parts in the several views.

Fig. 1 is a perspective view of an axis-orbital plane recorder according to the present invention and shown in operative position on a human head.

Fig. 2 is an enlarged perspective view of said recorder.

The recorder device that is illustrated comprises, generally, a bow 5, nose-engaging means 6 substantially centrally carried by said bow, an orbital point indicating means 7 adjustably carried by the bow adjacent the nose-engaging means 6, and mandible axis indicating means 8 adjustably carried, one on each side of the bow.

The bow 5 is advantageously made of a length of form-retaining wire and is somewhat U-shaped to have a front part 9 and side parts or legs 10. The latter are preferably bent inwardly toward each other substantially in the manner shown. Thus, the bow is wider across the front than across the opening between the rear ends of legs 10 for the purpose of clearing the face anterior to the ears. Said ends 10 are adapted to fit the head in the creases between the ears and the head, as shown in Fig. 1, the angle of the legs being such as to bring the indicating means 7 clear of the side of the head in all positions of adjustment thereof.

The nose-engaging means 6 is shown as a saddle part 11 that is adapted to fit over the bridge of the nose, the same being affixed to a collar 12 that is strung on the front part 9 of the bow and is adapted to be adjustably fixed to said bow part as by a set screw 13.

It will be clear from the foregoing that the bow 5 has a three-point support—the upper ear notches and the nose bridge or nasion.

The orbital point indicating means 7 is shown as comprising a block 14 carried by one end by the part 9 of the bow, the same being slidable along bow part 9 and adapted to be fixed in adjusted position by a set screw 15. The other, or free, end of the block 14 carries a recording pin 16 that is adjustable relative to the block and adapted to be fixed in adjusted position by a set screw 17. Since bow part 9 is horizontal and pin 16 vertical, the block 14 has holes therein formed at right angles to each other to accommodate said part 9 and pin 16. The lower end of recording pin 16 is bent at an angle to form an index or pointer 18, the pin being rotationally adjustable, also, so that said pointer may be directed as desired.

The mandible axis indicating means 8 comprises similar structures on each bow end 10, the same being substantially similar to the orbital point indicating means 7. Thus, each structure of means 8 comprises a block 19, similar to block 14, a set screw 20 to adjustably affix the block to bow end 10, a pin 21, similar to pin 16, except that the same has a straight index or pointer 22, and a set screw 23 to adjustably fix pin 21 in block 19.

It will be clear from the above, that each structure of means 8 is adjustable along bow end 10, is angularly adjustable thereon around said bow end as an axis, and that pin 20 is adjustable relative to the block 19 and in a direction transverse to the axis of adjustment of said block.

In use, the bow is mounted on the head in the manner hereinabove indicated. First, the recording pin 16 and its index end 18 is adjusted to a pre-selected mark 24, the same denoting the lower border of the right eye orbit. The set screws 15 and 17 are tightened to fix said pin in adjusted position.

Now, the block 19, on one side, is moved along the bow end 10 and tipped or tilted while the projection of pin 21 is adjusted to bring the pointer 22 thereof into light contact with a predetermined mark 25, the same representing the hinge axis location. When proper coincidence is achieved, the set screws 20 and 23 are tightened. The procedure is repeated on the opposite side with respect to a similar predetermined mark of the hinge axis.

After these three adjustments have been made, the device is removed from the head. The distance from the point of pin 16 to the under surface of block 14 (or other selected reference point) is measured and recorded. Similarly, the distance from the point of each pin 21 and its mounting block 19 is measured and recorded. Also, the distance between each said block 19 and the ends of the bow-ends 10 is measured and recorded. Also the distance of block 14 from the collar 12 is measured and recorded.

At any time thereafter, when it is necessary to relocate the above three axis points to establish the axis-orbital plane defined thereby, the pins 16 and 21 are re-set on their blocks and the blocks re-set on the bow according to the records thereof. Then, the bow is mounted on the head as before. When the pin 16 is rotated to bring the end 18 thereof into contact with the side of he nose, the orbital point 24 will be found. When the blocks 19 are tipped down to bring the points 22 of pins 20 into contact with the sides of the face, the right and left axis points 25 will be found.

While the foregoing has illustrated and described what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described the invention, what is claimed and desired to be secured by Letters Patent is:

1. An axis-orbital plane recording device comprising a U-shaped bow member having a front part and side parts that are angularly directed toward each other, at their free ends, a nose-engaging means adjustably carried by the front part of the bow and cooperating, when on the bridge of the nose, with the mentioned side parts to support the bow member on the head, when said side parts are engaged in the notches formed between the ears and head, an adjustable orbital point indicating means carried by the front part of the bow, and an adjustable mandible axis indicating means carried by each side part forward of the ear-engaging portions of said side parts.

2. An axis-orbital plane recording device according to claim 1: each said indicating means comprising a block slidably and tiltably carried by the bow, and a recording pin slidably carried by each block and directed to be transverse to the portion of the bow on which each respective block is mounted.

3. An axis-orbital plane recording device according to claim 1: each said indicating means comprising a block slidably and tiltably carried by the bow, and a recording pin slidably carried by each block and directed to be transverse to the portion of the bow on which each respective block is mounted, the recording pin of the orbital point indicating means being provided with an angularly bent indicating end.

4. Means to record an axis-orbital plane comprising a U-shaped member, nose-engaging means mounted on the base of said member, three slidably adjustable blocks tiltably mounted on said member adjacent said nose-engaging means, two blocks being mounted on the legs of the U and one block being mounted at the base of the U, and an adjustable recording pin carried by each block, each pin being normal to the U-shaped member and offset therefrom.

5. Means to record an axis-orbital plane comprising a U-shaped member, nose-engaging means mounted on the base of said member, three slidably adjustable blocks, each block being tiltably mounted on said member, and an adjustable recording pin carried by each block, each pin being normal to said member and offset therefrom.

6. Means to record an axis-orbital plane comprising a U-shaped member, nose-engaging means mounted on the base of said member, three slidably adjustable blocks, each block being tiltably mounted on said member, and an adjustable recording pin carried by each block, each pin being normal to said member and offset therefrom, the end of one of said pins being bent at an angle to the length thereof to form an indicating end.

7. Means to record an axis-orbital plane according to claim 6: in which the nose-engaging means is adapted to be mounted on the bridge of a nose, and in which the last-mentioned pin is carried by a block mounted adjacent the nose-engaging means, whereby the mentioned indicating end of said pin is adapted to indicate a position on the nose.

References Cited in the file of this patent
UNITED STATES PATENTS

| 833,204 | Crawford | Oct. 16, 1906 |
| 1,070,123 | Evans | Aug. 12, 1913 |
| 2,125,809 | Pucket | Aug. 2, 1938 |

OTHER REFERENCES

S. S. White: General Catalog of Dental Supplies, 1934, page 221.